US007248175B2

(12) United States Patent
Wu

(10) Patent No.: US 7,248,175 B2
(45) Date of Patent: Jul. 24, 2007

(54) SYNCHRONOUSLY LIGHTING APPARATUS OF VEHICLE METER

(76) Inventor: Shih-Hsiung Wu, No. 406, Ding-Ann Street, An-Nan District, Tainan City (TW)

(*) Notice: Subject to any disclaimer, the term of this patent is extended or adjusted under 35 U.S.C. 154(b) by 190 days.

(21) Appl. No.: 11/049,982

(22) Filed: Feb. 4, 2005

(65) Prior Publication Data

US 2006/0187076 A1 Aug. 24, 2006

(51) Int. Cl.
*G08B 5/00* (2006.01)

(52) U.S. Cl. .................. 340/815.4; 340/461; 340/438; 340/441; 362/61

(58) Field of Classification Search ............. 340/815.4, 340/461, 438, 441, 428, 439, 458, 815.65, 340/815.66; 362/23, 61
See application file for complete search history.

(56) References Cited

U.S. PATENT DOCUMENTS 4,415,855 A * 11/1983 Dubauskas .................. 324/114
5,284,108 A * 2/1994 Furuya ....................... 116/286
5,376,917 A * 12/1994 Yoshimoto et al. ......... 340/438
5,636,145 A * 6/1997 Gorman et al. ............. 702/148
6,302,551 B1 * 10/2001 Matumoto .................. 362/27
6,802,276 B2 * 10/2004 Sugimoto ................. 116/62.1

* cited by examiner

*Primary Examiner*—Daryl C Pope
(74) *Attorney, Agent, or Firm*—Rosenberg, Klein & Lee

(57) ABSTRACT

The present invention relates to a synchronously lighting apparatus of a vehicle meter. The digital signal transformed from the measured value triggers the light-emitting device of the light-outputting group so as to change the lighting status and triggers the display machine synchronously. Accordingly, an obvious warning is obtained.

6 Claims, 4 Drawing Sheets

125A P1 12 11 125(125B) 1 Z2

SYNCHRONOUSLY LIGHTING APPARATUS OF VEHICLE METER

FIELD OF THE INVENTION

The present invention relates to a synchronously lighting apparatus of a vehicle meter, and more particularly to an apparatus for showing status variation of the vehicle.

BACKGROUND OF THE INVENTION

The increasingly expanded static functionalities and dynamic statuses of the vehicle are displayed by means of measuring meters, for example, a speed meter, an engine speed meter, a fuel meter, an in-vehicle temperature meter, etc. The measuring meters of the general vehicle for showing measurement data are designed to fit for use habit of the driver, wherein all measuring meters are designed in the form of LCD panels, pointer type display panels, or digital simulated pointer type display panels. Consequentially, these measuring meters do not provide eye-catching warning effect for the driver.

A conventional technique discloses an electronic control loop that triggers a RGB light-emitting device by comparing and mixing lights and changes light-projecting sources with different colors by a microprocessor in accordance with setting values of the meters. The driver is aware of various warring messages through variation of the projected lights so as to prevent himself from danger. Accordingly, these pointer type meters achieve the purpose of controlling color.

The microprocessor disclosed in this conventional technique is for receiving pointer-shifting signals and outputting corresponding control programs stored in the memory to the electronic control loop by means of control, operation, etc. However, the function of receiving pointer-shifting signals means that this conventional technique must provide at least one electrical connection to the pointer. Nevertheless, the modern vehicle meter does not necessarily adopt the pointer as its indication tool. It may adopt the digital symbols. Moreover, the function of receiving pointer-shifting signals means that the microprocessor operates in accordance with the received pointer-shifting signals. In case the pointer has a breakdown or a malfunction, the display tool is totally not able to work.

However, the aforementioned conventional technique is merely confined to the color domain while the human eyes sense the status variation by means of color, lighting, and light intensity.

SUMMARY OF THE INVENTION

In view of the aforementioned problems of the conventional technique, the present inventor provides a synchronously lighting apparatus of a vehicle meter. The exterior main body of the vehicle meter primarily consists of a meter shell. The synchronously lighting apparatus is a control loop that mounts inside the meter shell. The control loop primarily comprises:

a signal transforming circuit formed on the control loop for electrically connecting with a target position of a vehicle and transforming a measured value of the target position into a digital signal;

a processing unit electrically connected with the signal transforming circuit for receiving the digital signal and performing operation and prosecution, the processing unit having a synchronization program for triggering at least a light-emitting device of a light-outputting group to change the lighting status in compliance with the digital signal;

the light-outputting group electrically connected to the processing unit and comprising the light-emitting device corresponding to a display machine; and the display machine electrically connected to the processing unit.

Because the target position electrically connects to the signal transforming circuit, the processing unit reads the measured value of the target position through the synchronization program. When the processing unit performs the operation and the prosecution, the light-emitting device is triggered and the display machine is also triggered synchronously to display the measured value.

Therefore, the digital signal transformed from the measured value triggers the light-emitting device to change the lighting status and triggers the display machine synchronously. Accordingly, an obvious warning is obtained. In case the display machine has a breakdown, the driver is still able to realize the status variation of the vehicle through the lighting variation of the light-emitting device.

The other features and preferred embodiments of the present invention will now be described with reference to the accompanying drawings.

DETAILED DESCRIPTION OF THE PREFERRED EMBODIMENT

The content of the present invention will become more apparent for the examiners from the following detailed description when taken in conjunction with the accompanying drawings.

Figure 1:
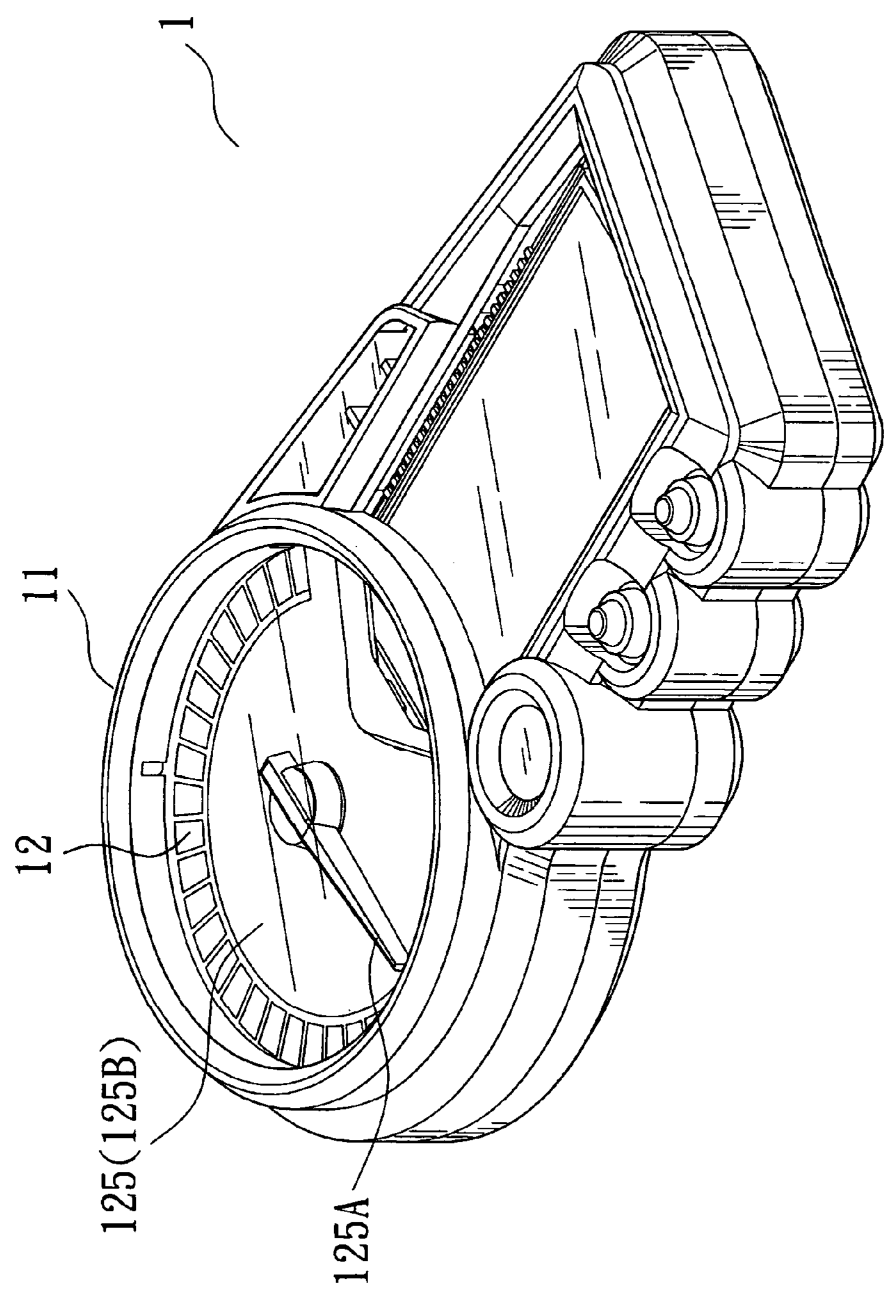
FIG. 1 is an elevation view showing an outward appearance of the present invention.
Figure 2:
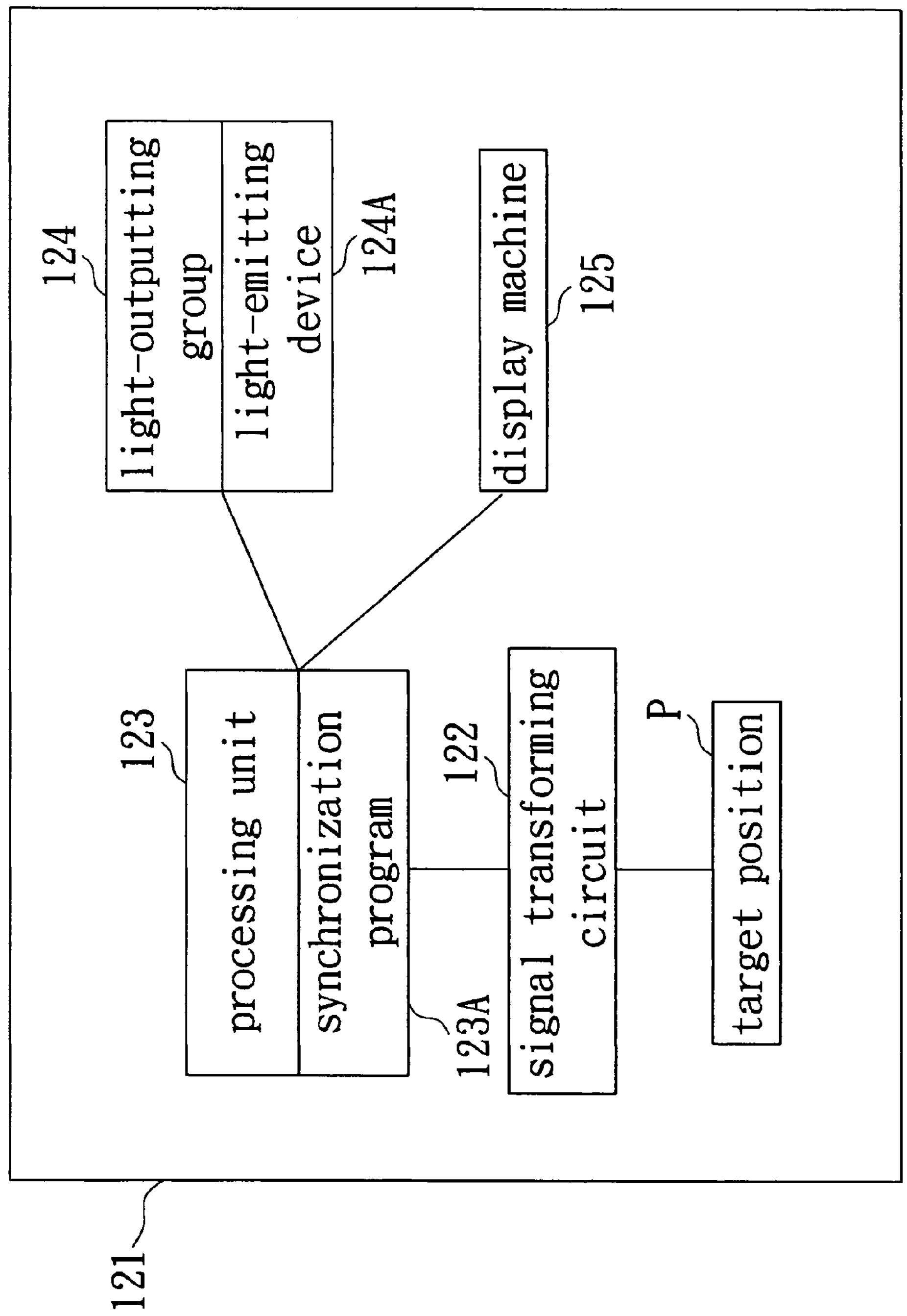
FIG. 2 is a schematic view showing the connection relationship between the devices of the present invention.
Figure 3:
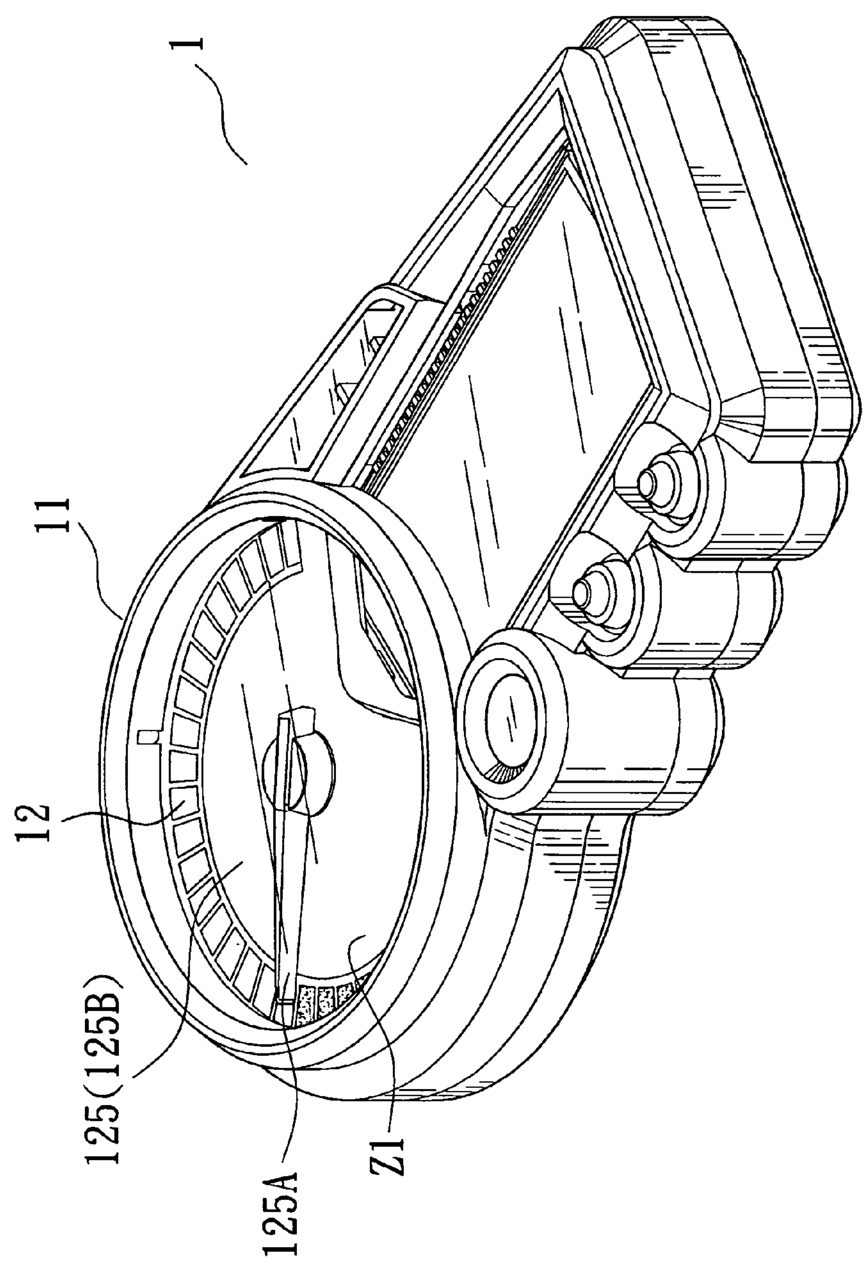
FIG. 3 is a schematic elevation view showing the working of the present invention.

Referring to FIG. 1 and FIG. 2, the present inventor relates to a synchronously lighting apparatus of a vehicle meter. The exterior main body of the vehicle meter 1 primarily consists of a meter shell 11. The synchronously lighting apparatus 12 is a control loop 121 that mounts inside the meter shell 11. The control loop 121 primarily comprises: a signal transforming circuit 122, a processing unit 123, a synchronization program 123A, a light-outputting group 124, a light-emitting device 124A, and a display machine 125.

The signal transforming circuit 122 is formed on the control loop 121 for electrically connecting with a target position P of a vehicle and transforming a measured value of the target position P into a digital signal. The so-called target position P may be referred to a wheel axle, the interior of the engine (temperature, rotation rate, etc), and fuel level. Moreover, the measured value of the target position P is displayed in digital form.

In order to distinguish the present invention from the conventional technique, the target position P of the present invention does not includes the pointer since the pointer is an indication tool not a target position.

The processing unit 123 is electrically connected with the signal transforming circuit 122 for receiving the digital signal and performing operation and prosecution such as trigger process. The processing unit 123 has a synchronization program 123A for triggering a light-emitting device 124A of a light-outputting group 124 to change the lighting status in accordance with the digital signal.

The light-outputting group 124 is electrically connected to the processing unit 123 and comprises at least one light-emitting device 124A corresponding to a display machine 125. The light-emitting device 124A is capable of changing the outputted light color. The light-emitting device 124A of the light-outputting group 124 is a RGB light-emitting device. In other words, the light-emitting device 124A can emit a monochromatic light or a hybrid chromatic light selected from a red light, a green light, and/or a blue light. Because the light-emitting device 124A is capable of showing color, the lightened light-emitting device 124A can changes the backlight color of the display machine 125.

The display machine 125 is electrically connected to the processing unit 123. The display machine 125 may be a LCD panel, a pointer display panel, or a digital simulated pointer type display panel. In the present invention, the pointer 125A and the meter dial 125B are exemplarily illustrated.

As shown in FIG. 1 through FIG. 4, when the present invention works, the signal transforming circuit 122 is electrically connected to the target position P. Next, the processing unit 123 reads the measured value of the target position P through the synchronization program 123A. When the processing unit 123 performs the operation and the prosecution, the light-emitting device 124A of the light-outputting group 124 is triggered to form various lighting sections Z1, Z2. Moreover, when the processing unit 123 performs the operation and the prosecution, the pointer 125A of the display machine 125 is also triggered to shift on the meter dial 125B.

Figure 4:
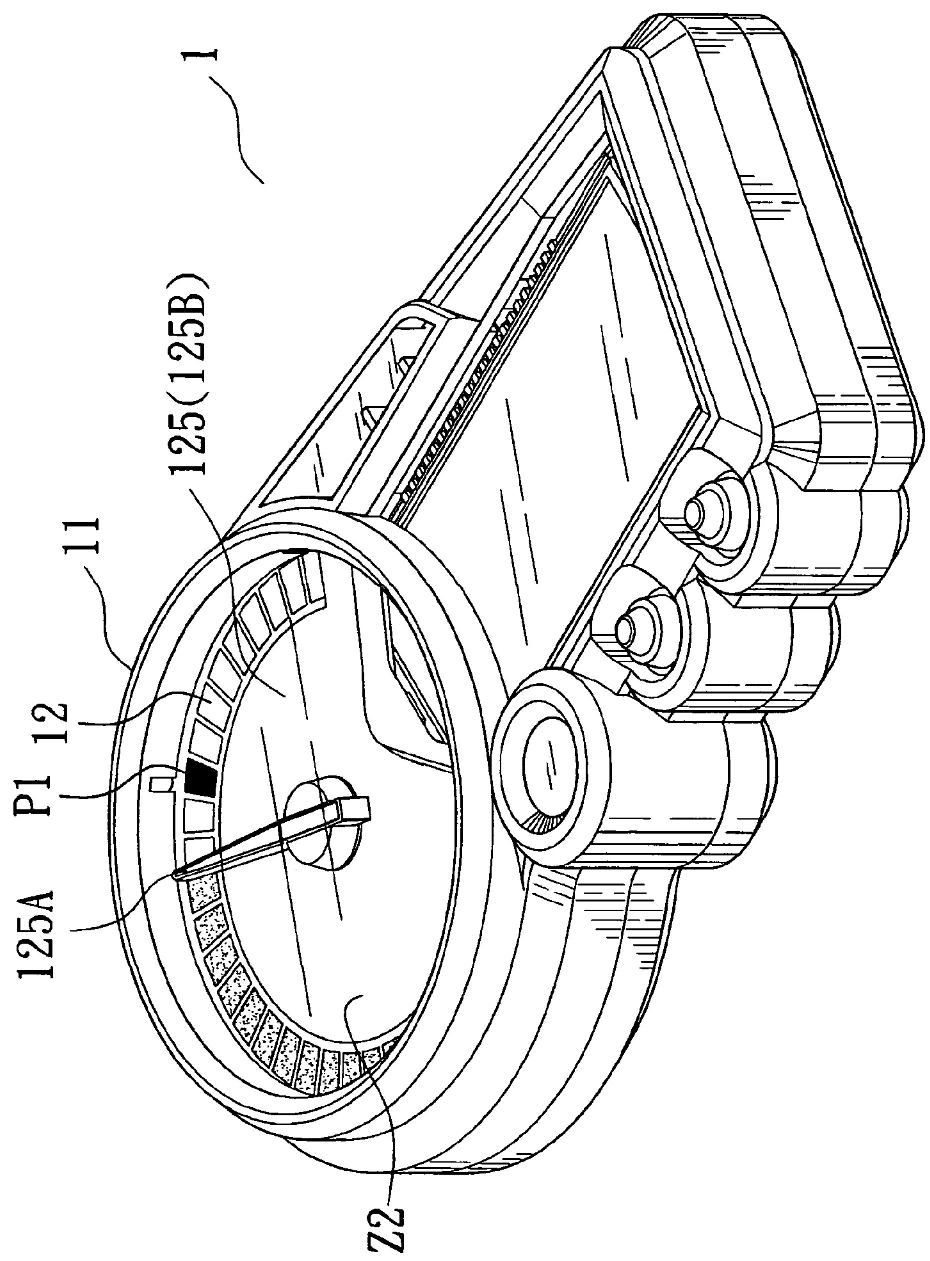
FIG. 4 is another schematic elevation view showing the working of the present invention.

Furthermore, as shown in FIG. 4, when the present invention is carried out, a highest record warning point P1 may be designed in circuitry. In other words, when the measured value of the target position P reaches the highest record, the display machine 125 will show the highest record so as to warn the driver.

It is apparent that the present invention provides the following advantages.

1. The present invention utilizes the digital signal transformed from the measured value of the target position of the vehicle to trigger the light-emitting device of the light-outputting group to change the lighting status and trigger the display machine synchronously. Accordingly, the warning effect of the present invention is obvious.

2. If the display machine has a breakdown, the driver is still able to realize the status variation of the vehicle through the lighting variation of the light-emitting device since the present invention adopts the so-called synchronous display.

3. The present invention can purely adopt a monochromatic light-emitting device to display a simple lighting variation. Besides, the present invention can adopt colored light-emitting devices to display the synchronous warning by means of color control.

In view of the description above, the present invention satisfies requirements for patentability namely utility, novelty, and nonobviousness. It is therefore submitted the present invention for a patent.

With the invention thus explained, it is apparent that various modifications and variations can be made without departing from the scope of the invention. It is therefore intended that the invention be limited only as indicated in the appended claims.

What the invention claimed is:

1. A synchronously lighting apparatus of a vehicle meter, wherein an exterior main body of the vehicle meter consists of a meter shell and the synchronously lighting apparatus is a control loop that mounts inside the meter shell, the control loop comprising:

a signal transforming circuit formed on the control loop for electrically connecting with a target position of a vehicle and transforming a measured value of the target position into a digital signal;

a processing unit electrically connected with the signal transforming circuit for receiving the digital signal and performing operation and prosecution, the processing unit having a synchronization program for triggering at least a light-emitting device of a light-outputting group to change the lighting status in accordance with the digital signal;

the light-outputting group electrically connected to the processing unit and comprising the light-emitting device corresponding to a display machine; and the display machine electrically connected to the processing unit, wherein the signal transforming circuit electrically connects to the target position and the processing unit reads the measured value of the target position through the synchronization program such that when the processing unit performs the operation and the prosecution, the light-emitting device is triggered and the display machine is also triggered synchronously to display the measured value.

2. The synchronously lighting apparatus of the vehicle meter of claim 1, wherein the display machine is a LCD panel.

3. The synchronously lighting apparatus of the vehicle meter of claim 2, wherein the LCD panel is a digital simulated pointer type display panel.

4. The synchronously lighting apparatus of the vehicle meter of claim 1, wherein the display machine is a pointer display panel.

5. The synchronously lighting apparatus of the vehicle meter of claim 1, wherein the light-emitting device of the light-outputting group is a RGB light-emitting device to make the lighting status also become a color-changeable status.

6. The synchronously lighting apparatus of the vehicle meter of claim 1, wherein the target position is a wheel axle.

* * * * *